US012800906B2

(12) United States Patent
Zimmer

(10) Patent No.: US 12,800,906 B2
(45) Date of Patent: Nov. 17, 2026

(54) MONOCULAR BRIDGE ASSEMBLY

(71) Applicant: Trent Zimmer, Youngsville, LA (US)

(72) Inventor: Trent Zimmer, Youngsville, LA (US)

(73) Assignee: UNITY Tactical, LLC, Broussard, LA (US)

(*) Notice: Subject to any disclaimer, the term of this patent is extended or adjusted under 35 U.S.C. 154(b) by 247 days.

(21) Appl. No.: 18/414,368

(22) Filed: Jan. 16, 2024

(65) Prior Publication Data

US 2024/0241361 A1 Jul. 18, 2024

Related U.S. Application Data

(60) Provisional application No. 63/439,224, filed on Jan. 16, 2023.

(51) Int. Cl.
*G02B 23/12* (2006.01)

(52) U.S. Cl.
CPC .................................. *G02B 23/125* (2013.01)

(58) Field of Classification Search
CPC .... G02B 23/125; G02B 23/16; G02B 23/165; G02B 23/20; G02B 27/0149; G02B 27/0176; G02B 2027/0154; G02B 2027/015; G02B 2027/0152; G02B 2027/0161; G02B 27/017; G02B 2027/0156; G02B 2027/0143; G02B 2027/0132; G02B 2027/0138; G02B 2027/0159; G02B 27/01; G02B 27/00; G02B 23/00; A42B 3/042; F16M 11/041; F16M 11/2085; F16M 13/00; F16M 345/08; F16M 359/413; F16M 345/07
See application file for complete search history.

(56) References Cited

U.S. PATENT DOCUMENTS

| | | | | |
|---|---|---|---|---|
| 5,331,459 A * | 7/1994 | Dor | G02B 23/125 359/630 |
| 5,815,126 A * | 9/1998 | Fan | G02B 27/017 345/87 |
| 7,945,967 B2 | 5/2011 | Barber et al. | |
| 8,209,780 B1 | 7/2012 | Lemire | |
| 11,229,252 B2 | 1/2022 | O'Connell | |
| 11,382,375 B2 | 7/2022 | Noordzij | |
| 2001/0054989 A1* | 12/2001 | Zavracky | G02B 27/017 345/8 |
| 2007/0012830 A1* | 1/2007 | Prendergast | G02B 23/125 248/200 |
| 2013/0083391 A1 | 4/2013 | Teetze et al. | |
| 2016/0227866 A1* | 8/2016 | Tal | F41G 3/225 |

* cited by examiner

*Primary Examiner* — Matthew Y Lee
(74) *Attorney, Agent, or Firm* — Asgaard Patent Services, LLC; F. Wayne Thompson, Jr.

(57) ABSTRACT

Disclosed is a bridge assembly for a monocular optical device. The bridge assembly allows for an attached optical device to be positioned in front of either the user's left or right eye. This repositioning of the optical device is achieved by laterally sliding the adapter plate, which connects the optical device to the bridge assembly, to align the eyepiece of the optical device with the desired eye. In some implementations, the ridge assembly is configured to enable the user to adjust the pupillary distance of the optical device.

20 Claims, 12 Drawing Sheets

MONOCULAR BRIDGE ASSEMBLY

CROSS-REFERENCE TO RELATED APPLICATION(S)

This application claims the benefit of U.S. Provisional Application Ser. No. 63/439,224, filed on Jan. 16, 2023, the entirety of which is incorporated herein by reference.

TECHNICAL FIELD

This disclosure relates to a monocular bridge assembly used to couple an optical device, such as a night vision goggle, to a helmet or other headgear equipped with a suitably configured mount interface, often referred to as a shroud.

BACKGROUND

Monocular bridge mounts offer a mounting solution for attaching a monocular optical device to headgear, such as a helmet. These bridge mounts are particularly useful in scenarios where hands-free operation is essential, such as in military, law enforcement, and recreational activities. Helmets suitable for this purpose typically feature a dedicated mount, referred to as a shroud, designed to removably receive a compatible mount that is attached to the optical device. This setup ensures a stable connection between the helmet and the optical device, which is crucial for operational efficiency and user comfort. While binocular bridge mounts are available, monocular optical devices are sometimes preferred due to cost, weight, and other considerations.

Accordingly, needs exist for the monocular bridge assembly disclosed herein. It is to the provision of a monocular bridge assembly configured to address these needs, and others, that the present invention is primarily directed.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a bridge assembly for a monocular optical device. The bridge assembly allows an attached optical device to be selectively positioned in front of either the user's left or right eye. This repositioning of the optical device is achieved by laterally sliding the adapter plate, which connects the optical device to the bridge assembly, to align the eyepiece of the optical device with the desired eye. In some implementations, the bridge assembly is configured to enable the user to adjust the pupillary distance of the attached optical device.

In one example implementation, a bridge assembly comprises a mounting shoe, a stem portion attached to the mounting shoe, a sliding arm member slidably coupled to the stem portion and including a first slot and a second slot, a first overtravel stop, a second overtravel stop, and an adapter plate slidably coupled to the sliding arm member. The first slot extends through the sliding arm member between a top side and a bottom side thereof, and includes an interior annular ledge that divides the first slot into a top groove and a bottom groove. The second slot extends through the sliding arm member between the top side and the bottom side thereof, and includes an interior annular ledge that divides the second slot into a top groove and a bottom groove. The first overtravel stop positioned within the bottom groove of the first slot, and the second overtravel stop positioned within the bottom groove of the second slot. The first overtravel stop and the second overtravel stop define respective lateral travel limits of the adapter plate.

In another example implementation, a bridge assembly comprises a mounting shoe, a stem portion attached to the mounting shoe, a sliding arm member slidably coupled to the stem portion and including a first slot and a second slot, and an adapter plate slidably coupled to the sliding arm member. The first slot extends through the sliding arm member between a top side and a bottom side thereof, and includes an interior annular ledge that divides the first slot into a top groove and a bottom groove. A first overtravel stop is positioned within the bottom groove of the first slot. The second slot extends through the sliding arm member between the top side and the bottom side thereof, and includes an interior annular ledge that divides the second slot into a top groove and a bottom groove. A second overtravel stop is positioned within the bottom groove of the second slot. The adapter plate includes an attachment interface configured to couple to a monocular optical device, and is configured to be laterally displaced between a first position in which the monocular optical device is disposed in front of a first eye of a user and a second position in which the monocular optical device is disposed in front of a second eye of the user. The first overtravel stop defines a first lateral travel limit of the adapter plate corresponding to the first position, and the second overtravel stop defines a second lateral travel limit of the adapter plate corresponding to the second position.

In yet another example implementation, a bridge assembly comprises a mounting shoe, a stem portion attached to the mounting shoe, a sliding arm member slidably coupled to the stem portion and including a first rail receiving receptacle, and an adapter plate slidably coupled to the sliding arm member and including a second rail receiving receptacle. The sliding arm member includes a longitudinally extending detent track on a top side of the sliding arm member, and a longitudinally extending detent track on a bottom side of the sliding arm member. The stem portion includes a first ball plunger assembly disposed within a bore in a downwardly facing surface of the first rail receiving receptacle. The first ball plunger assembly includes a spring-loaded ball biased into contact with the longitudinally extending detent track on the top side of the sliding arm member. The adapter plate includes a second ball plunger assembly disposed within a bore in an upwardly facing surface of the second rail receiving receptacle. The second ball plunger assembly includes a spring-loaded ball biased into contact with the longitudinally extending detent track on the bottom side of the sliding arm member. The longitudinally extending detent track on the top side of the sliding arm member comprises a longitudinally extending groove having a detent on each end.

BRIEF DESCRIPTION OF THE DRAWINGS

Like reference numerals refer to corresponding parts throughout the several views of the drawings.

DETAILED DESCRIPTION

Figure 1:
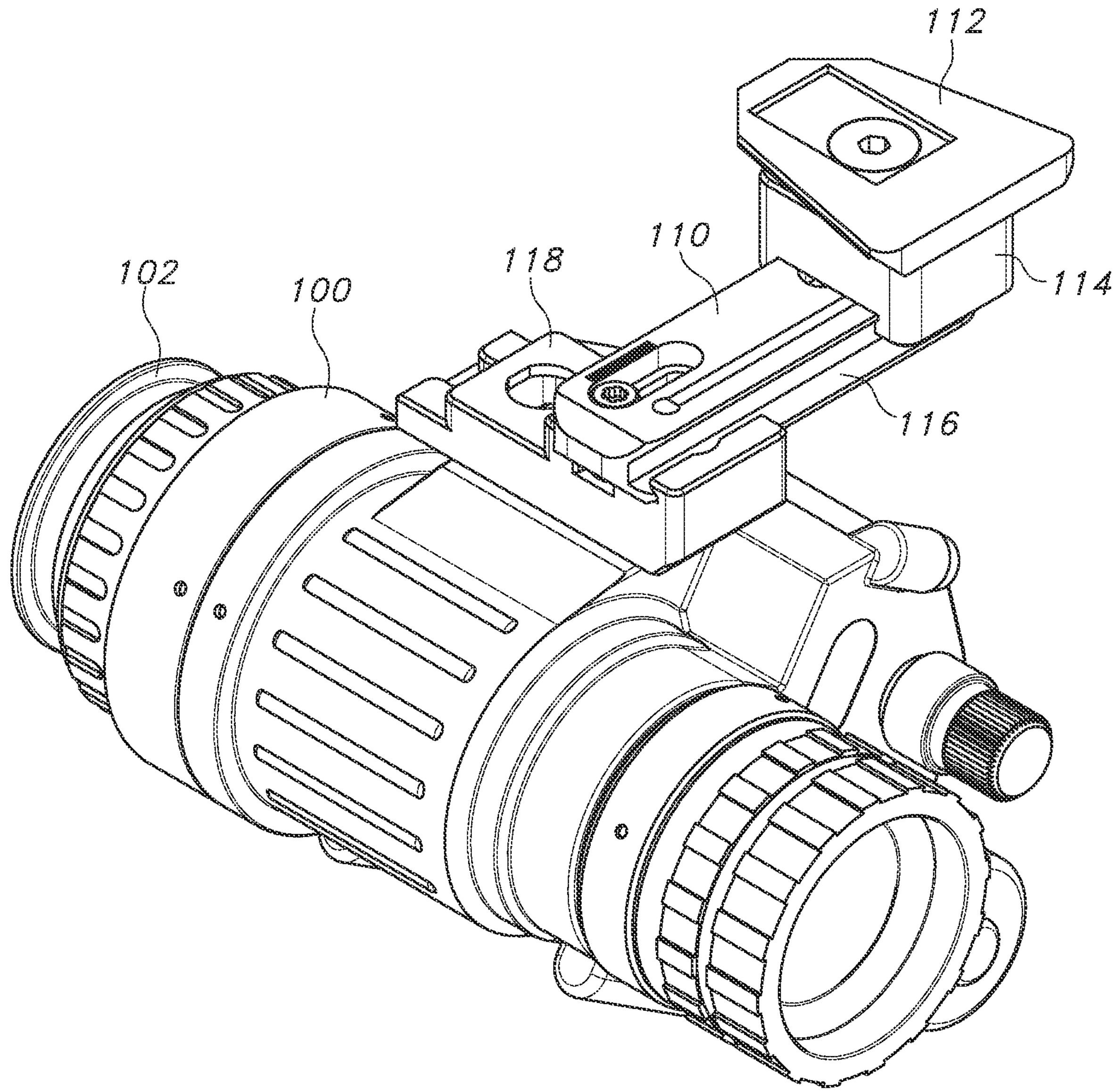
FIG. 1 is an isometric view of an optical device coupled to a monocular bridge assembly consistent with the principles of the present disclosure.
Figure 2:
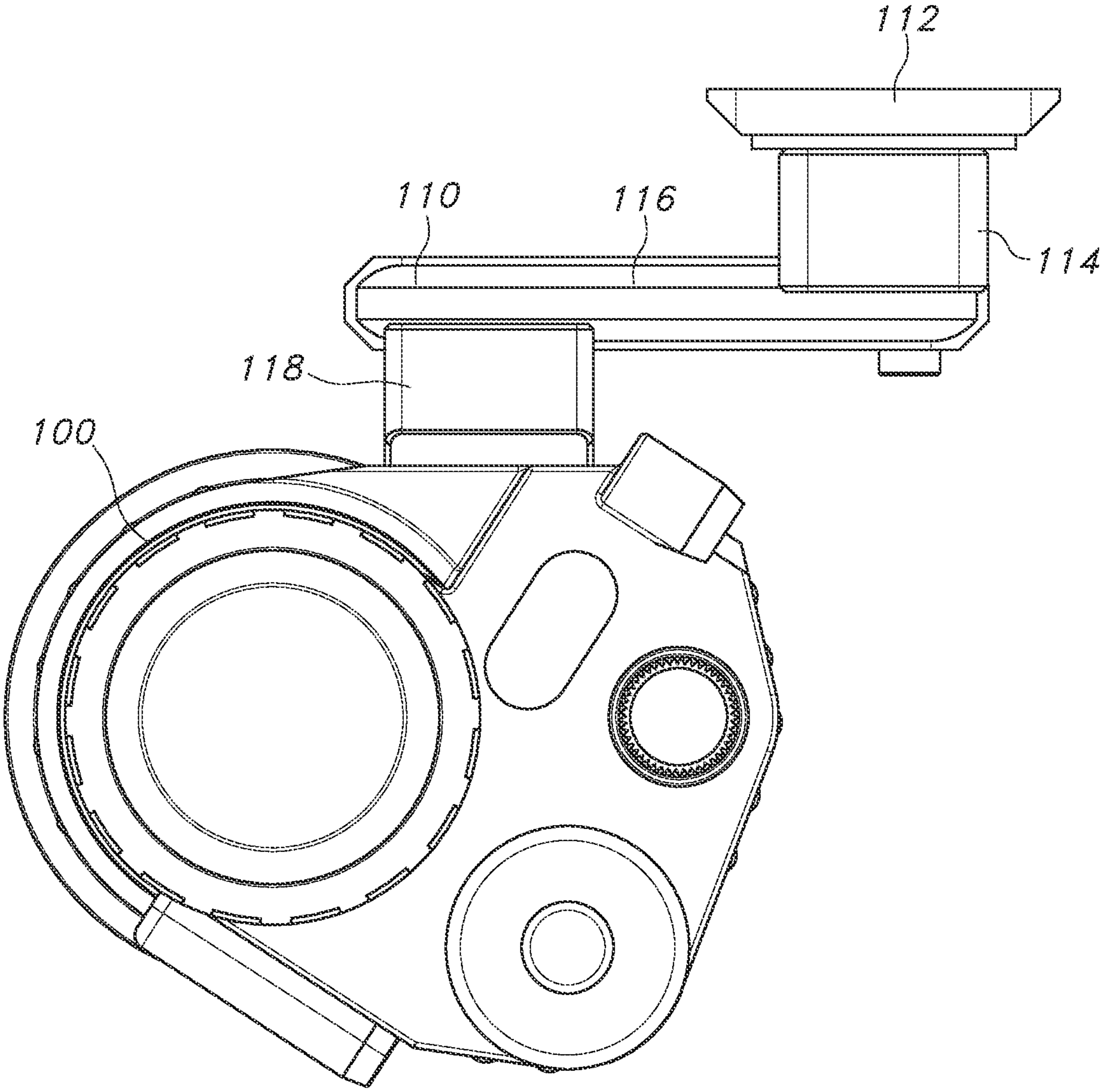
FIG. 2 is a front plan view of the optical device coupled to the monocular bridge assembly shown in FIG. 1. In this view, the optical device is in a first position.
Figure 3:
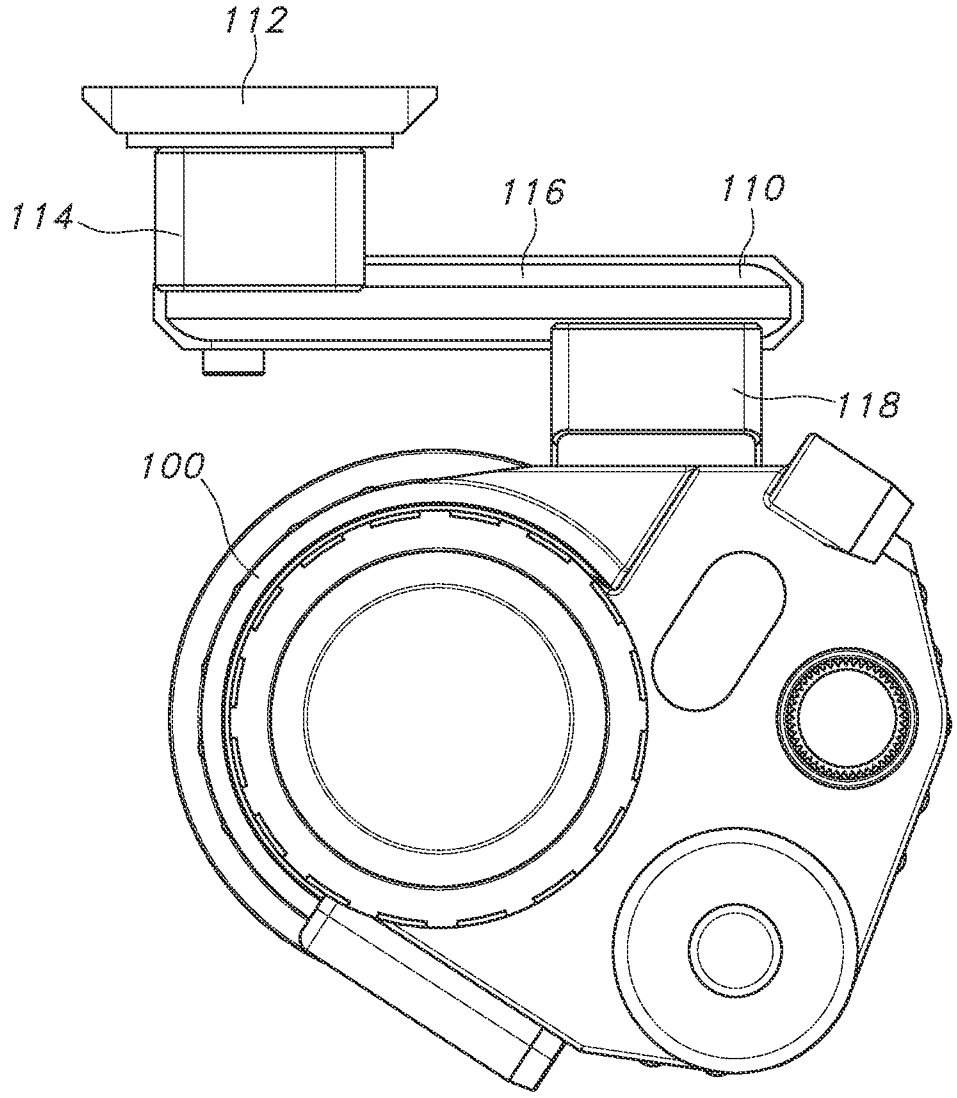
FIG. 3 is another front plan view of the optical device and monocular bridge assembly shown in FIG. 1. In this view, the optical device is in a second position.
Figure 4:
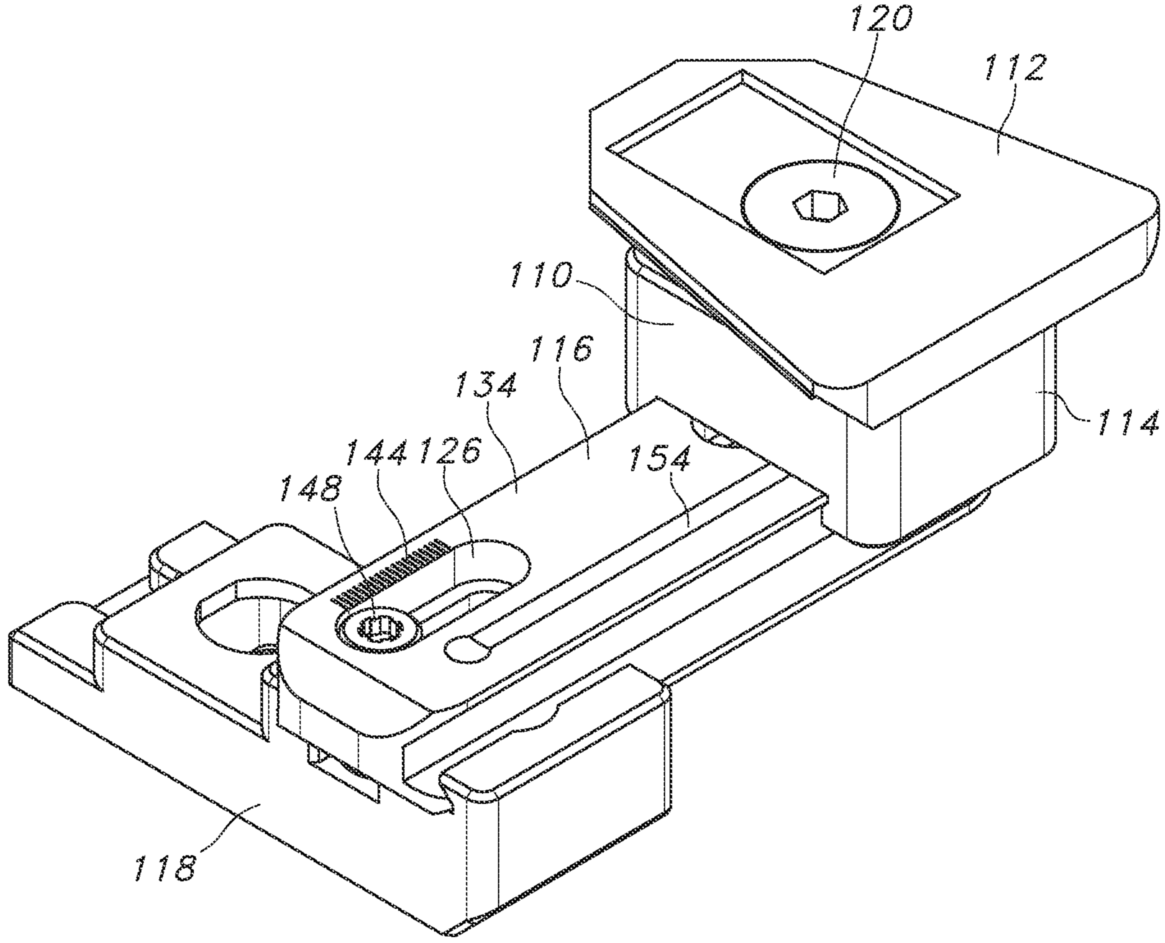
FIG. 4 is an isometric view of the monocular bridge assembly shown in FIG. 1.
Figure 5:
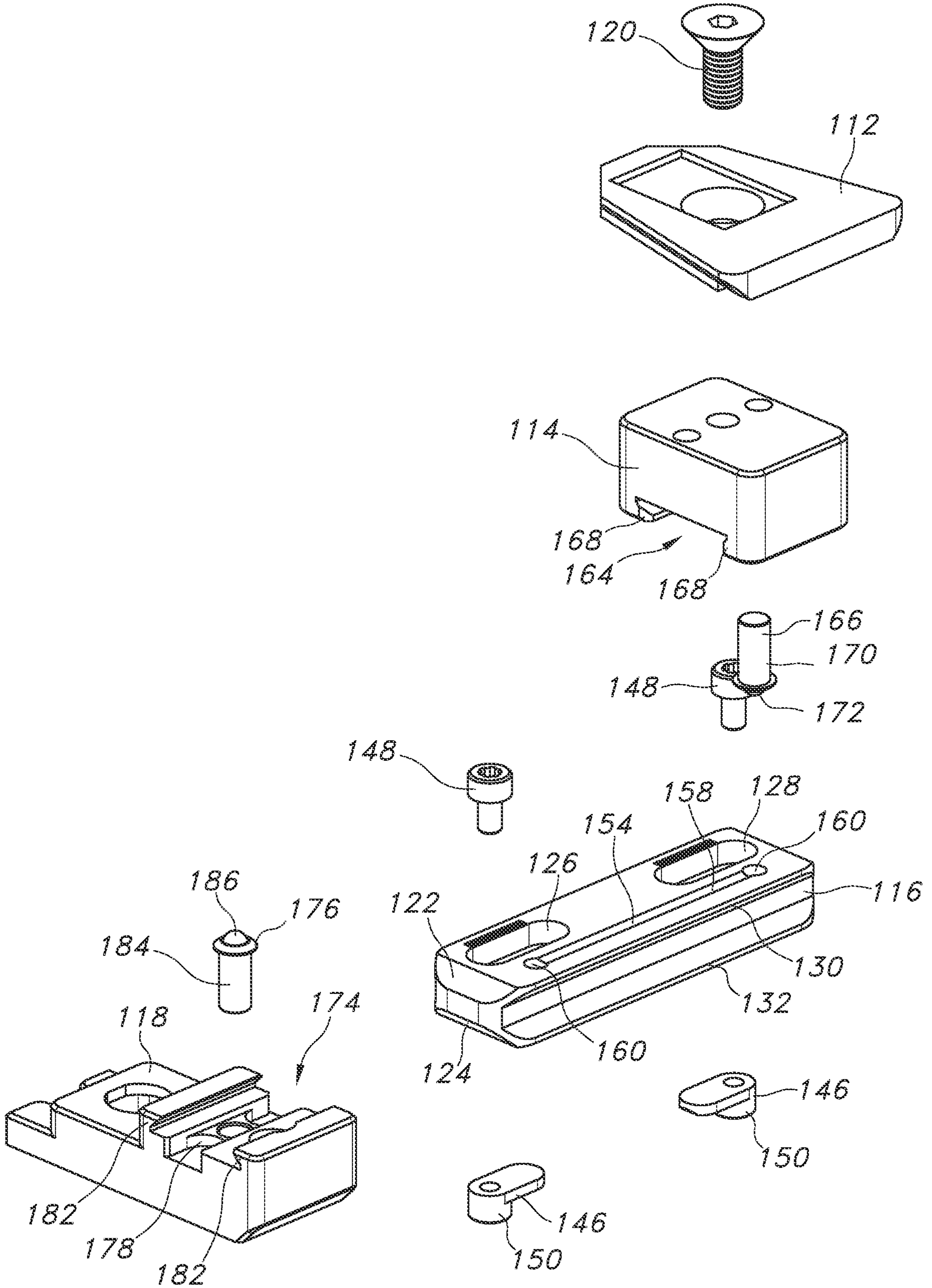
FIG. 5 is an exploded isometric view of the monocular bridge assembly shown in FIG. 4.
Figure 6:
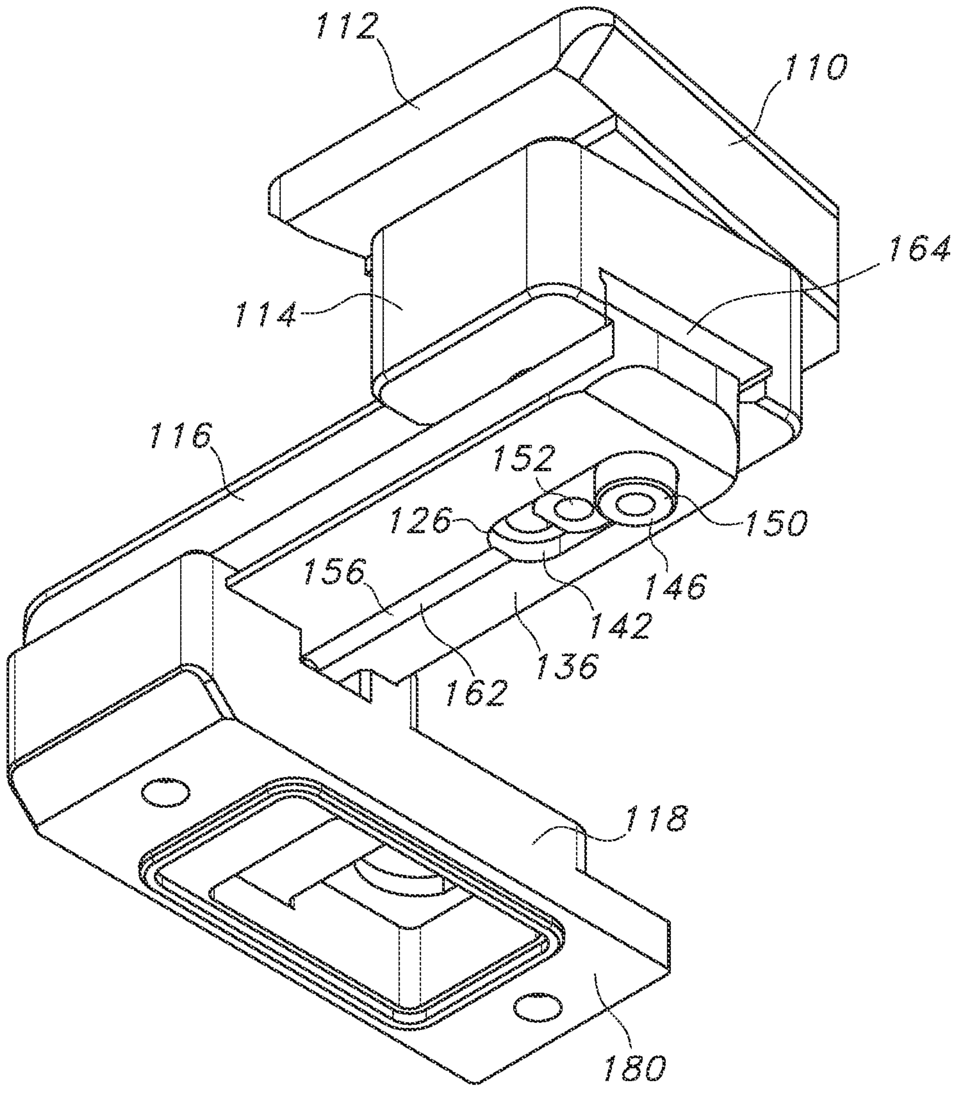
FIG. 6 is another isometric view of the monocular bridge assembly shown in FIG. 4.
Figure 7:
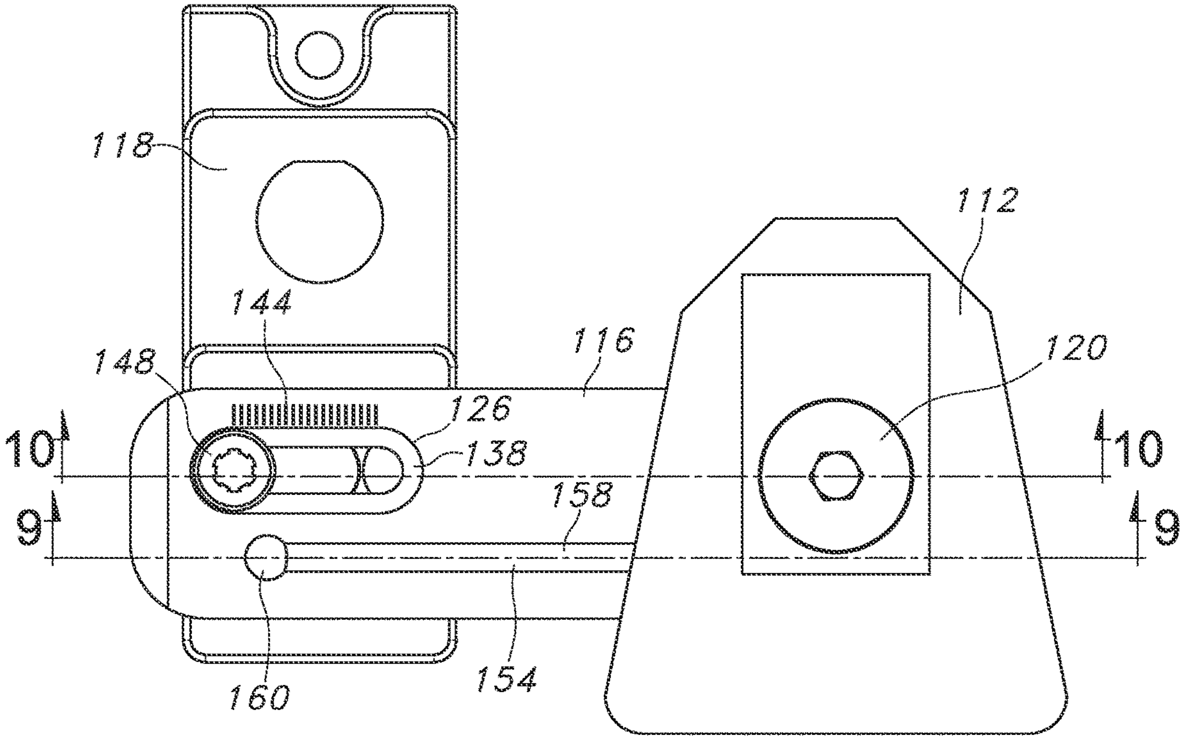
FIG. 7 is a top plan view of the monocular bridge assembly shown in FIG. 4.
Figure 8:
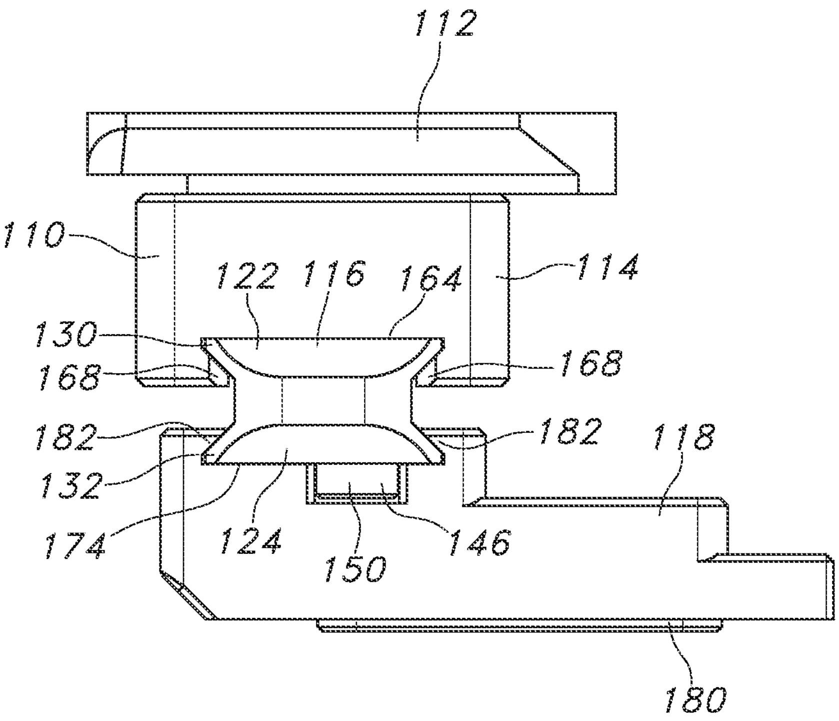
FIG. 8 is a side elevational view of the monocular bridge assembly shown in FIG. 4.

FIGS. 1-3 illustrate an optical device 100 coupled to a monocular bridge assembly 110 consistent with the principles of the present disclosure. The optical device 100 is a PVS-14 night vision device. However, it will be recognized that the monocular bridge assembly 110 may be adapted for use with other monocular optical devices. The monocular bridge assembly 110 is configured to allow a user to alternatively position an eyepiece 102 of the optical device 100 in front of a right eye (see, e.g., FIG. 2) or a left eye (see, e.g., FIG. 3) of the user. The monocular bridge assembly 110 is also configured to enable a user to set the pupillary distance of the attached optical device 100.

As shown best in FIGS. 4-8, in some implementations, the monocular bridge assembly 110 comprises a mounting shoe 112, a stem portion 114, a sliding arm member 116, and an adapter plate 118 for the optical device 100.

The mounting shoe 112 of the monocular bridge assembly 110 is configured to cooperate with and be removably coupled to a helmet mount, such as a G24 mount sold by Wilcox Industries Corp. The mounting shoe 112 is secured to the stem portion 114 of the monocular bridge assembly 110 by a threaded fastener 120.

The sliding arm member 116 of the monocular bridge assembly 110 comprises an upper portion 122, a lower portion 124, and two slots 126, 128. The upper portion 122 includes a dovetail rail 130 and the lower portion 124 includes another dovetail rail 132. The dovetail rail 130 on the upper portion 122 is sized to be slidably coupled to a rail receiving receptacle 164 on an underside of the stem portion 114; the dovetail rail 132 on the lower portion 124 is sized to be slidably coupled to a rail receiving receptacle 174 on a top side of the adapter plate 118. Each of the two slots 126, 128 extend through the sliding arm member 116, between a top side 134 and a bottom side 136 thereof. Each slot 126, 128 includes an interior annular ledge 138, dividing the slot into a top groove 140 and a bottom groove 142. Hash marks 144 or other indicia are positioned adjacent the top groove 140 of each slot, the purpose of which will be described below.

The sliding arm member 116 further comprises a longitudinally extending detent track 154 on the top side 134 and another longitudinally extending detent track 156 on the bottom side 136. The longitudinally extending detent track 154 on the top side 134 includes a longitudinally extending groove 158 having a detent 160 on each end. Each detent 160 is shaped to receive a ball. The longitudinally extending detent track 156 on the bottom side 136 includes a longitudinally extending groove 162 and the detent 152 of each overtravel stop 146, described in detail below.

Figure 10:
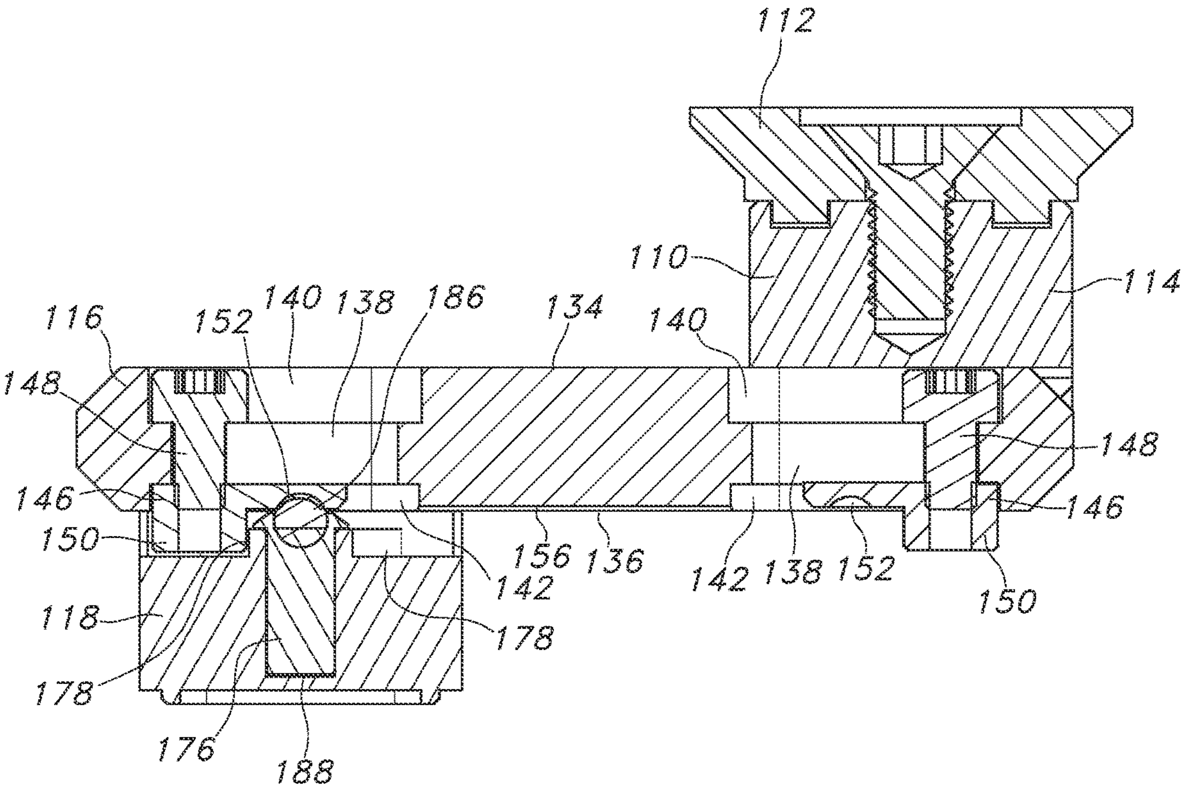
FIG. 10 is a side cutaway view of the monocular bridge assembly taken along lines 10-10 shown in FIG. 7.
Figure 14:
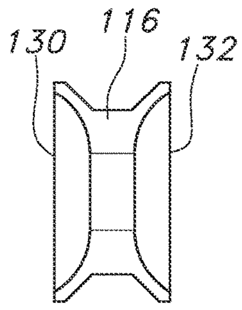
FIG. 14 is a side elevational view of the sliding arm member shown in FIG. 11.
Figure 12:
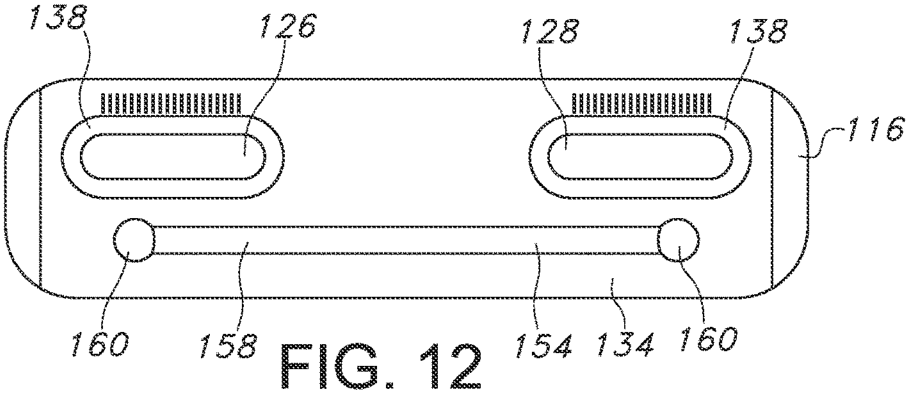
FIG. 12 is a top plan view of the sliding arm member shown in FIG. 11.
Figure 11:
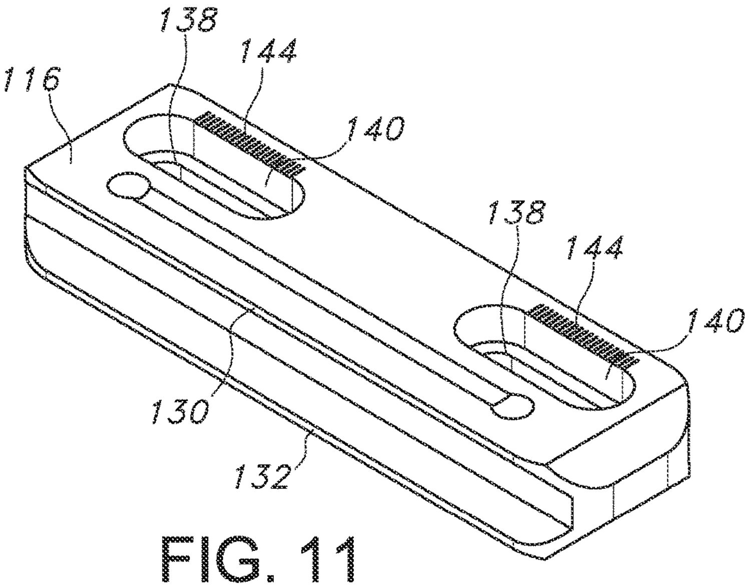
FIG. 11 is an isometric view of a sliding arm member of the monocular bridge assembly shown in FIG. 4.
Figure 13:
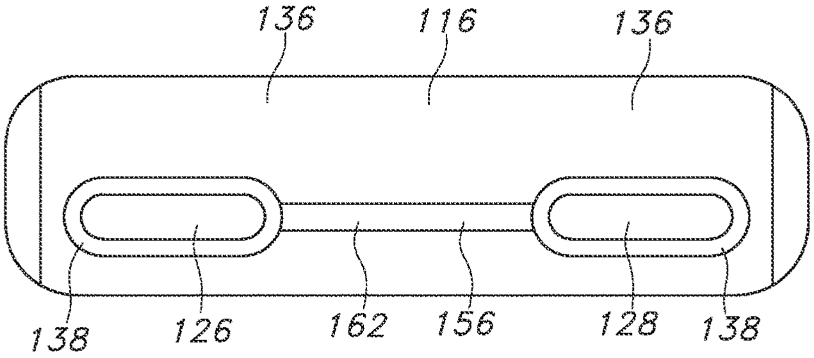
FIG. 13 is a bottom plan view of the sliding arm member shown in FIG. 11.
Figure 17:
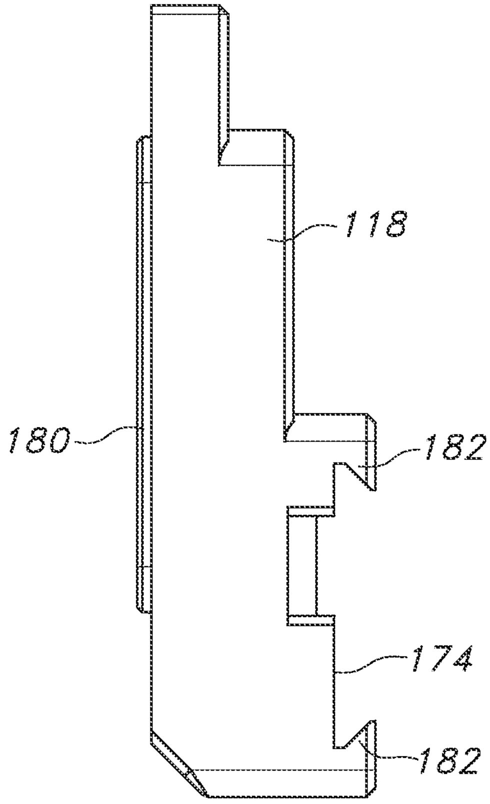
FIG. 17 is a side elevational view of the adapter plate shown in FIG. 15.

An overtravel stop 146 is positioned within the bottom groove 142 of each slot 126, 128 in the sliding arm member 116. Each overtravel stop 146 is fixed in position within the bottom groove 142 of a slot 126, 128 by a fastener 148 nested within the top groove 140 of the same slot 126, 128. By loosening the fastener 148, an overtravel stop 146 can be slidably repositioned within the bottom groove 142. In this way, the user can set the pupillary distance of the attached optical device 100 for each eye. Each overtravel stop 146 comprises a cylindrical boss 150, a portion of which extends from the bottom groove 142, and a detent 152 (see, e.g., FIG. 6). The fastener 148 may be threadedly secured within a bore in the cylindrical boss 150 of the overtravel stop 146. The detent 152 is on a downwardly facing surface of the overtravel stop 146 and forms a portion of the longitudinally extending detent track 156 on the bottom side 136 of the sliding arm member 116 (see, e.g., FIG. 10).

Figure 9:
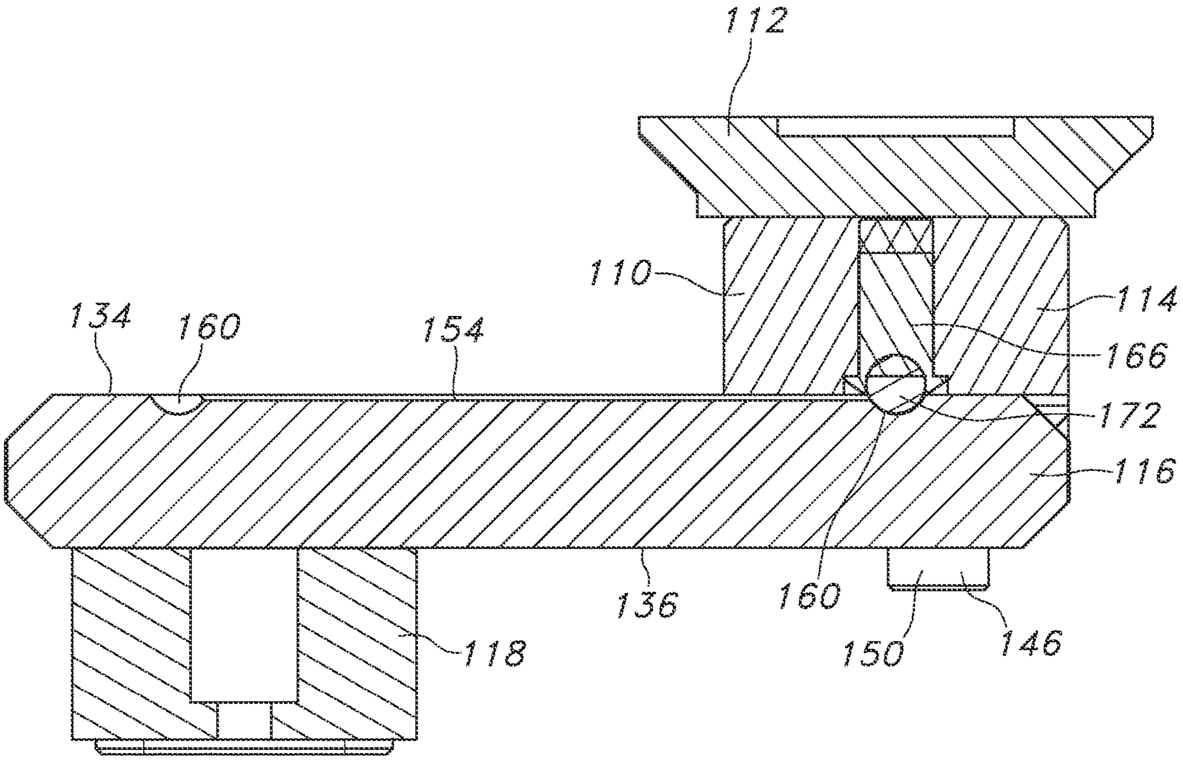
FIG. 9 is a side cutaway view of the monocular bridge assembly taken along lines 9-9 shown in FIG. 7.

The stem portion 114 of the monocular bridge assembly 110 comprises the rail receiving receptacle 164 and a ball plunger assembly 166. The rail receiving receptacle 164 may include a pair of parallel engagement members 168 configured to cooperate with the dovetail rail 130 on the upper portion 122 of the sliding arm member 116 (see, e.g., FIG. 8). The ball plunger assembly 166 is nested within a bore in a downwardly facing surface of the rail receiving receptacle 164, between the engagement members 168. The ball plunger assembly 166 comprises a housing 170 and a spring-loaded ball 172. The bore is positioned so that the spring-loaded ball 172 is placed into operational contact with the longitudinally extending detent track 154 on the top side 134 of the sliding arm member 116 (see, e.g., FIG. 9). In this way, the spring-loaded ball 172 is positioned to cooperate with one of the detents 160 and thereby temporarily fix the sliding arm member 116 in either a first position, shown in FIG. 2, or a second position, shown in FIG. 3. Also, it should be understood that further lateral movement of the sliding arm member 116 is prevented by the spring-loaded ball 172 engaging the detent 160 on either end of the longitudinally extending detent track 154.

Figure 16:
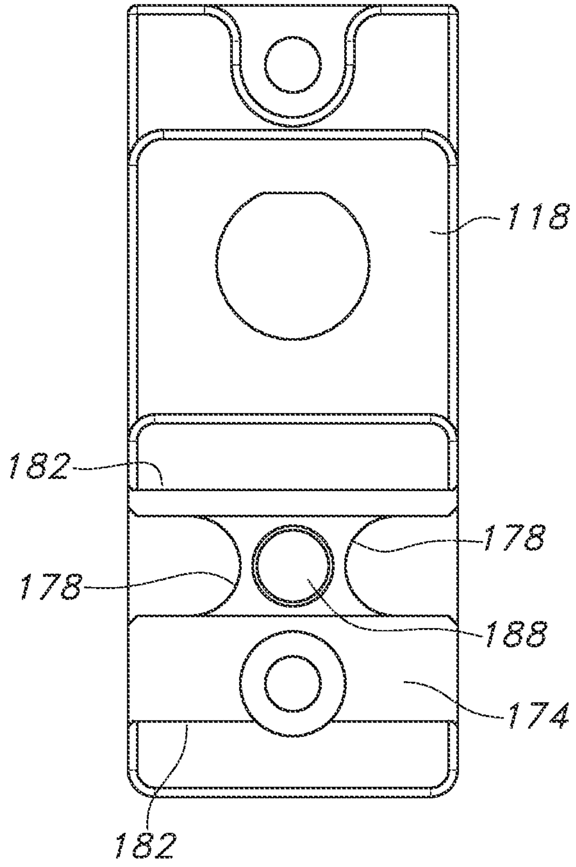
FIG. 16 is a top plan view of the adapter plate shown in FIG. 15.
Figure 15:
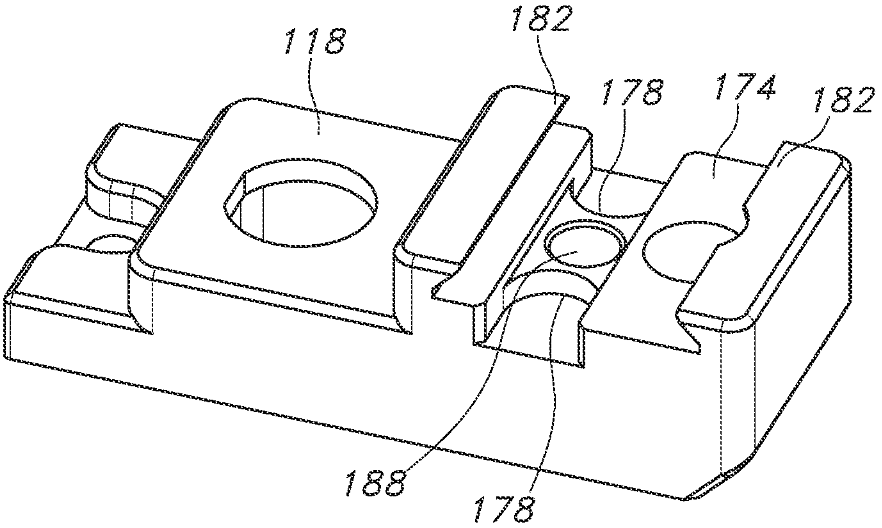
FIG. 15 is an isometric view of an adapter plate of the monocular bridge assembly shown in FIG. 4.

The adapter plate 118 of the monocular bridge assembly 110 is configured to slide transversely along the sliding arm member 116 between two positions, enabling the user to alternatively position the eyepiece of the optical device in front of the right eye or the left eye of the user. The adapter plate 118 comprises the rail receiving receptacle 174, a ball plunger assembly 176, two end stops 178, and an attachment interface 180. The rail receiving receptacle 174 may include a pair of parallel engagement members 182 configured to cooperate with the dovetail rail 132 on the lower portion 124 of the sliding arm member 116 (see, e.g., FIG. 8). The ball plunger assembly 176 is nested within a bore 188 in an upwardly facing surface of the rail receiving receptacle 174, between the engagement members 182. The ball plunger assembly 176 comprises a housing 184 and a spring-loaded ball 186. The bore 188 is positioned so that the spring-loaded ball 186 is placed into operational contact with the longitudinally extending detent track 156 on the bottom side 136 of the sliding arm member 116 (see, e.g., FIG. 10). The two end stops 178 are positioned adjacent to, and on opposite sides of, the bore 188 for the ball plunger assembly 176 (see, e.g., FIG. 16). Each of the end stops 178 is an arcuate surface configured to engage the cylindrical boss of an overtravel stop 146 when either directional travel limit of the adapter plate 118 is reached (see, e.g., FIG. 10). The attachment interface 180 on the bottom side of the adapter plate 118 is configured so that the optical device 100 can be attached thereto. While the example optical device 100 is a PVS-14 night vision device, the attachment interface 180 of the adapter plate 118 can be configured to facilitate the attachment of other monocular optical devices, such as night vision devices, thermal imaging devices, and SWIR (short wave infrared) imaging devices.

The mounting shoe 112, the stem portion 114, the sliding arm member 116, and the adapter plate 118 may be fabricated from an aluminum alloy, or another suitable material.

USE AND OPERATION

The monocular bridge assembly 110 can be used to alternatively position the optical device 100 in front of the right eye or the left eye of the user. In particular, the optical device 100 can be moved between the two positions by simply sliding the adapter plate 118 towards the position that places the eyepiece 102 of the optical device 100 in front of the desired eye.

In operation, the adapter plate 118 will slide transversely along the sliding arm member 116 towards the desired position, until one of the end stops 178 engages the cylindrical boss 150 of an overtravel stop 146 and the spring-loaded ball 186 of the ball plunger assembly 176 engages the detent 152 of the overtravel stop 146. This positions the adapter plate 118 on one end of the sliding arm member 116. Further lateral movement of the adapter plate 118 causes the sliding arm member 116 to slide through the rail receiving receptacle 164 of the stem portion 114 until the spring-loaded ball 172 of the ball plunger assembly 166 engages the detent 160 at the end of the longitudinally extending detent track 154 on the top surface 134 of the sliding arm member 116. In this way, the optical device 100 is positioned in front of the desired eye by the user. If needed, the pupillary distance can now be adjusted by loosening the fastener 148 and repositioning the overtravel stop 146 within the bottom groove 142 of the appropriate slot (126 or 128).

The foregoing description of the present disclosure is intended to be illustrative; it is not intended to be exhaustive or to limit the claims to the precise forms disclosed. Those skilled in the relevant art will appreciate that many modifications and variations are possible in light of the foregoing description and associated drawings.

Reference throughout this specification to an "embodiment," "implementation," or words of similar import indicates that a particular described feature, structure, or characteristic is included in at least one embodiment of the present disclosure. Thus, the phrase "in some implementations," or a phrase of similar import, as used throughout this specification, does not necessarily refer to the same embodiment.

The described features, structures, or characteristics may be combined in any suitable manner in one or more embodiments. In the above description, numerous specific details are provided for a thorough understanding of embodiments of the present disclosure. One skilled in the relevant art will recognize, however, that embodiments of the present disclosure can be practiced without one or more of the specific details, or with other methods, components, materials, etc. In other instances, well-known structures, materials, or operations may not be shown or described in detail.

The invention claimed is:

1. A bridge assembly comprising:

a mounting shoe;

a stem portion attached to the mounting shoe;

a sliding arm member slidably coupled to the stem portion, the sliding arm member including a first slot extending through the sliding arm member between a top side and a bottom side thereof, the first slot including an interior annular ledge that divides the first slot into a top groove and a bottom groove, and a second slot extending through the sliding arm member between the top side and the bottom side thereof, the second slot including an interior annular ledge that divides the second slot into a top groove and a bottom groove;

a first overtravel stop positioned within the bottom groove of the first slot;

a second overtravel stop positioned within the bottom groove of the second slot; and an adapter plate slidably coupled to the sliding arm member;

wherein the first overtravel stop and the second overtravel stop define respective lateral travel limits of the adapter plate.

2. The bridge assembly of claim 1, wherein the first overtravel stop is slidably repositionable within the bottom groove of the first slot, and the second overtravel stop is slidably repositionable within the bottom groove of the second slot.

3. The bridge assembly of claim 1, wherein each of the first overtravel stop and the second overtravel stop comprises a cylindrical boss.

4. The bridge assembly of claim 3, wherein the adapter plate includes end stops configured to engage the cylindrical bosses of the first overtravel stop and the second overtravel stop, respectively.

5. The bridge assembly of claim 1, wherein the adapter plate is laterally displaceable until one of the first overtravel stop and the second overtravel stop is engaged by the adapter plate.

6. A bridge assembly comprising:

a mounting shoe;

a stem portion attached to the mounting shoe;

a sliding arm member slidably coupled to the stem portion, the sliding arm member including a first slot extending through the sliding arm member between a top side and a bottom side thereof, the first slot including an interior annular ledge that divides the first slot into a top groove and a bottom groove, and a first overtravel stop positioned within the bottom groove of the first slot, and a second slot extending through the sliding arm member between the top side and the bottom side thereof, the second slot including an interior annular ledge that divides the second slot into a top groove and a bottom groove, and a second overtravel stop positioned within the bottom groove of the second slot; and an adapter plate slidably coupled to the sliding arm member, the adapter plate including an attachment interface configured to couple to a monocular optical device, the adapter plate being configured to be laterally displaced between a first position in which the monocular optical device is disposed in front of a first eye of a user and a second position in which the monocular optical device is disposed in front of a second eye of the user;

wherein the first overtravel stop defines a first lateral travel limit of the adapter plate corresponding to the first position, and the second overtravel stop defines a second lateral travel limit of the adapter plate corresponding to the second position.

7. The bridge assembly of claim 6, wherein the first overtravel stop is fixed in position by a first fastener nested within the top groove of the first slot and the second overtravel stop is fixed in position by a second fastener nested within the top groove of the second slot.

8. The bridge assembly of claim 6, wherein the first overtravel stop is slidably repositionable within the bottom groove of the first slot, and the second overtravel stop is slidably repositionable within the bottom groove of the second slot.

9. The bridge assembly of claim 6, wherein the first overtravel stop comprises a first cylindrical boss, and the second overtravel stop comprises a second cylindrical boss.

10. The bridge assembly of claim 9, wherein the adapter plate includes a first end stop configured to engage the first cylindrical boss at the first lateral travel limit of the adapter plate, and a second end stop configured to engage the second cylindrical boss at the second lateral travel limit of the adapter plate.

11. The bridge assembly of claim 10, wherein the first end stop comprises an arcuate surface configured to engage the first cylindrical boss, and the second end stop comprises an arcuate surface configured to engage the second cylindrical boss.

12. The bridge assembly of claim 6, wherein the sliding arm member comprises an upper portion including a dovetail rail and a lower portion including a dovetail rail, the dovetail rail on the upper portion is slidably coupled to a first rail receiving receptacle on an underside of the stem portion, and the dovetail rail on the lower portion is slidably coupled to a second rail receiving receptacle on a top side of the adapter plate.

13. The bridge assembly of claim 12, wherein the first rail receiving receptacle includes a pair of parallel engagement members configured to cooperate with the dovetail rail on the upper portion of the sliding arm member, and the second rail receiving receptacle includes a pair of parallel engagement members configured to cooperate with the dovetail rail on the lower portion of the sliding arm member.

14. The bridge assembly of claim 13, wherein the sliding arm member further comprises a longitudinally extending detent track on a top side of the sliding arm member and a longitudinally extending detent track on a bottom side of the sliding arm member; the stem portion includes a first ball plunger assembly disposed within a bore in a downwardly facing surface of the first rail receiving receptacle, the first ball plunger assembly including a spring-loaded ball in operational contact with the longitudinally extending detent track on the top side of the sliding arm member; and the adapter plate includes a second ball plunger assembly disposed within a bore in an upwardly facing surface of the second rail receiving receptacle, the second ball plunger assembly including a spring-loaded ball in operational contact with the longitudinally extending detent track on the bottom side of the sliding arm member.

15. The bridge assembly of claim 14, wherein the longitudinally extending detent track on the top side of the sliding arm member comprises a longitudinally extending groove having a detent on each end.

16. The bridge assembly of claim 14, wherein the longitudinally extending detent track on the bottom side of the sliding arm member comprises a longitudinally extending groove and a detent associated with each of the first overtravel stop and the second overtravel stop.

17. A bridge assembly comprising:

a mounting shoe;

a stem portion attached to the mounting shoe, the stem portion including a first rail receiving receptacle;

a sliding arm member slidably coupled to the stem portion, the sliding arm member including a longitudinally extending detent track on a top side of the sliding arm member and a longitudinally extending detent track on a bottom side of the sliding arm member; and an adapter plate slidably coupled to the sliding arm member, the adapter plate including a second rail receiving receptacle;

wherein the stem portion includes a first ball plunger assembly disposed within a bore in a downwardly facing surface of the first rail receiving receptacle, the first ball plunger assembly including a spring-loaded ball biased into contact with the longitudinally extending detent track on the top side of the sliding arm member; and wherein the adapter plate includes a second ball plunger assembly disposed within a bore in an upwardly facing surface of the second rail receiving receptacle, the second ball plunger assembly including a spring-loaded ball biased into contact with the longitudinally extending detent track on the bottom side of the sliding arm member;

wherein the longitudinally extending detent track on the top side of the sliding arm member comprises a longitudinally extending groove having a detent on each end.

18. The bridge assembly of claim 17, wherein the first rail receiving receptacle includes a first pair of parallel engagement members and the second rail receiving receptacle includes a second pair of parallel engagement members.

19. The bridge assembly of claim 17, wherein the sliding arm member comprises an upper portion including a first dovetail rail and a lower portion including a second dovetail rail, with the first dovetail rail being slidably coupled to the first rail receiving receptacle and the second dovetail rail being slidably coupled to the second rail receiving receptacle.

20. The bridge assembly of claim 18, wherein the bore in which the first ball plunger assembly is disposed is positioned between the first pair of parallel engagement members, and the bore in which the second ball plunger assembly is disposed is positioned between the second pair of parallel engagement members.

* * * * *